United States Patent
Hohenacker

(10) Patent No.: US 10,431,085 B2
(45) Date of Patent: Oct. 1, 2019

(54) PARKING SPACE MONITORING SYSTEM

(71) Applicant: CLEVERCITI SYSTEMS GMBH, Munich (DE)

(72) Inventor: Thomas Hohenacker, Starnberg (DE)

(73) Assignee: CLEVERCITI SYSTEMS GMBH, Munich (DE)

( * ) Notice: Subject to any disclaimer, the term of this patent is extended or adjusted under 35 U.S.C. 154(b) by 0 days.

(21) Appl. No.: 15/747,422

(22) PCT Filed: Apr. 26, 2017

(86) PCT No.: PCT/EP2017/059955
§ 371 (c)(1),
(2) Date: Jan. 24, 2018

(87) PCT Pub. No.: WO2017/186805
PCT Pub. Date: Nov. 2, 2017

(65) Prior Publication Data
US 2019/0114916 A1     Apr. 18, 2019

(30) Foreign Application Priority Data

Apr. 29, 2016 (DE) .......... 10 2016 107 995

(51) Int. Cl.
*G08G 1/14* (2006.01)
*G06K 9/00* (2006.01)

(52) U.S. Cl.
CPC ......... *G08G 1/142* (2013.01); *G06K 9/00771* (2013.01); *G06K 9/00785* (2013.01); *G06K 2209/23* (2013.01)

(58) Field of Classification Search
CPC ........ G08G 1/144; G08G 1/146; G08G 1/143; G08G 1/168; G08G 1/147; G08G 1/04;
(Continued)

(56) References Cited

U.S. PATENT DOCUMENTS 6,559,776 B2 * 5/2003 Katz ................... G07B 15/02
340/932.2
7,382,278 B2 * 6/2008 Buschman ......... G06Q 30/0284
340/932.2

(Continued)

FOREIGN PATENT DOCUMENTS

EP          2 535 886 A1     12/2012

OTHER PUBLICATIONS

German Search Report dated Feb. 27, 2017.

*Primary Examiner* — Mark S Blouin
(74) *Attorney, Agent, or Firm* — Amster, Rothstein & Ebenstein LLP

(57) ABSTRACT

The invention relates to a parking space monitoring system for detecting free and occupied parking space areas in a parking space zone comprising a detection system that is configured to detect a plurality of different vehicles on the parking space areas of the parking space zone and at least one display unit for displaying a plurality of different occupied and/or free parking space areas, with the display unit having a display surface for presenting information. The parking space monitoring system is characterized in that the display surface comprises at least two surface areas, with the surface areas being adjacent to one another and/or adjoining one another and each having a different spatial orientation, and with the display unit being configured to display different information, in particular indications of different occupied and/or free parking space areas, in different surface areas.

24 Claims, 2 Drawing Sheets

Figure 1:
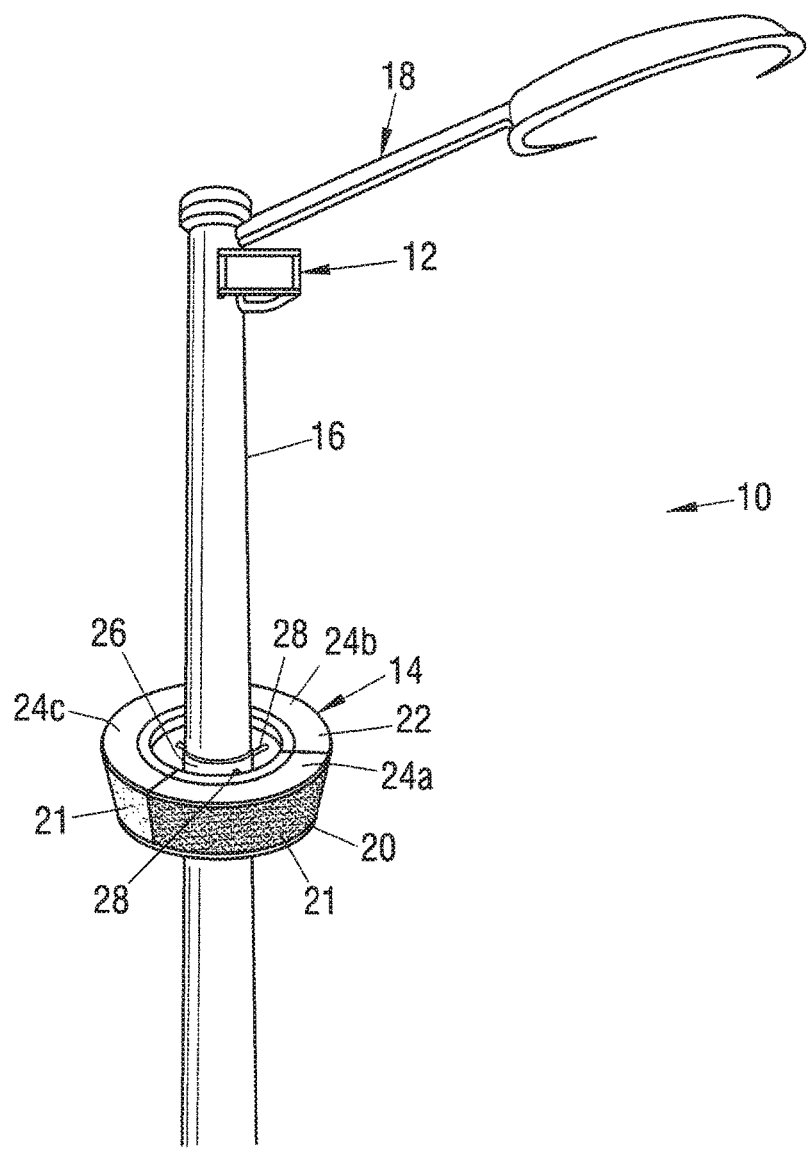

(58) Field of Classification Search
CPC ...... G08G 1/141; G08G 1/0112; G08G 1/142; G08G 1/148; G08G 1/14
USPC .................................................. 340/932.2
See application file for complete search history.

(56) References Cited

U.S. PATENT DOCUMENTS

| | | | |
|---|---|---|---|
| 7,893,847 B2* | 2/2011 | Shanbhag | G08G 1/14 340/435 |
| 8,600,800 B2* | 12/2013 | Rowe | G06Q 30/02 705/13 |
| 8,872,674 B1* | 10/2014 | Subramanya | G01S 7/2926 340/933 |
| 9,013,326 B2* | 4/2015 | Desiderio | G01S 7/003 340/425.5 |
| 9,213,098 B2* | 12/2015 | Rodrich | G01S 15/04 |
| 9,536,370 B2* | 1/2017 | Jones | G07B 15/02 |
| 10,008,115 B2* | 6/2018 | Singh | G06K 9/00771 |
| 10,121,172 B2* | 11/2018 | Hudson | G06Q 30/0284 |
| 2014/0176349 A1 | 6/2014 | Sullin et al. | |
| 2015/0369618 A1 | 12/2015 | Barnard et al. | |

* cited by examiner

PARKING SPACE MONITORING SYSTEM

The present invention relates to a parking space monitoring system for detecting free and occupied parking space areas in a parking space zone. The parking space monitoring system comprises a detection system that is configured to detect a plurality of different vehicles on the parking space areas of the parking space zone and at least one display unit for displaying a plurality of different occupied and/or free parking space areas, wherein the display unit has a display surface for presenting information.

Parking space monitoring systems that show drivers of vehicles the way to free parking space areas with the aid of a display unit are generally known. The display units in this respect are typically planar signs into which a numerical display has been embedded that indicates how many parking space areas are still free, for example on a level of a multi-level car park.

It is disadvantageous with such display units that such display units are restricted to the display of predefined information. In addition, a plurality of such display units have to be used to guide a drive to a free parking space area.

It is therefore the underlying object of the invention to provide a parking space monitoring system which allows an improved and more flexible display of information.

This object is satisfied by a parking space monitoring system in accordance with claim 1 and in particular in that the display area comprises at least two surface areas, with the surface areas being adjacent to one another and/or adjoining one another and each having a different spatial orientation, and with the display unit being configured to display different information, in particular indications of different occupied and/or free parking space areas, in different surface areas.

In other words, the display surface can e.g. be curved and/or can be composed of a plurality of planar surfaces. This means that the normal vectors of the surface areas are not in parallel, but rather include an angle with one another.

In accordance with the invention, different information can be displayed simultaneously in different areas (i.e. in different surface areas) of the display unit. It is hereby in particular made possible to indicate a plurality of different free and/or occupied parking space areas using a single display unit. For example, a first free parking space area can be indicated in a first surface area, e.g. by means of a green color and/or by means of an arrow in the direction of the free parking space area. A second surface area can present information on occupancy for a second parking space area, e.g. by means of a red color or an "X" for an occupied parking space area. In this manner, different states of occupancy of a plurality of different parking space areas can be presented by means of a single display unit.

In accordance with the invention, different information, e.g. on the occupancy status of different parking space areas, can be presented to a user in a manner that is compact and fast to be understood. It is moreover possible due to the curved display surface also to indicate a direction to a user in which e.g. a free parking space area is located. As a consequence the parking space monitoring system in accordance with the invention can greatly simplify the locating of free parking space areas and the navigation on parking space zones.

Individual aspects of the parking space monitoring system will be explained more exactly in the following.

A plurality of different vehicles is in particular understood as at least two vehicles, preferably at least four, eight or ten vehicles. The display of a plurality of different occupied and/or free parking space areas serves the display of at least two parking space areas, preferably at least four, eight or ten parking space areas.

A surface area can be a flat (i.e. planar) surface.

The display surface can in particular be a peripheral display surface. The display surface can consequently easily be recognized from different directions so that the information shown on the display surface can be recognized easily from practically any direction, that is from every location of a driver. Information on the occupancy status of a plurality of parking space areas can be displayed on the display surface.

The display surface can, for example, be shaped like a lateral surface of a cylinder, with the surface areas in this case each being able to be infinitesimally small strips. Alternatively or additionally, the display surface can also comprise spherical or semispherical areas. The surface of the display surface can therefore be formed as convex in general terms.

It is a particular advantage of such a display surface with respect to flat displays that the driver can see the display surface independently of his position. This is not the case with flat displays. The latter can no longer be read as soon as the driver has driven past the display. It is a further advantage that drivers from an opposite direction can also recognize the display surface so that only a single display unit can be sufficient for different directions of travel.

The display surface preferably serves for the guiding of vehicles to free parking space areas. For this purpose, for example, moving arrows that indicate free parking space areas can be displayed on the display surface. The display surface can in principle be configured to present any desired information.

The detection system and the display unit can communicate with one another. In this process, the detection system can tell the display unit where free and/or occupied parking space areas are located. Alternatively, the detection system can communicate the information to be displayed to the display unit. The display unit then presents the information received from the detection system on the display surface and shows drivers the way to free parking space areas in this manner.

An evaluation unit can be provided in the parking space monitoring system for the detection of free and occupied parking space areas. The evaluation unit can be arranged in the detection system, for example.

A parking space area designates a surface zone in which a plurality of parking space areas are located. A parking space area can also be called a single parking space, that is one parking space area typically provides space for one vehicle. The parking space areas can have different sizes and can thus, for example, be adapted to the size of passenger cars, trucks or bicycles.

The parking space areas within the parking space zone can be fixed at one time, for example. Alternatively, the parking space areas can also be recognized with reference to the position of vehicles. In addition, areas can also be fixed or determined in which parking is generally unwanted or prohibited (prohibited zones). Such areas can e.g. be a street or a fire engine access zone.

The vehicles can be passenger cars, trucks, motorcycles, bicycles, trailers and the like. It is likewise possible that the vehicles are ships or aircraft. In this case, the parking space areas can be mooring stations of a port or park positions at an airport.

Free parking space areas along a street or along another parking space zone can be displayed by means of the display unit and in particular by means of the information shown on the display area. Information on an accident (danger signs), speed limits, price information on the parking space areas or on free parking space areas in the vicinity can e.g. also be presented. Due to the differently oriented surface areas, the information can be recognized particularly easily in this process from many different directions of view, whereby the locating of a free parking space area is substantially facilitated. A driver can, for example, already recognize at the start of a street whether there is a free parking space area in the middle of the street. Where free parking space zones are located can also e.g. be made visible by the display unit for practically any desired positions of a driver on large company parking lots or customer parking lots. Green arrows can, for example, be shown on the display area for this purpose to indicate free parking space areas. If no parking space areas are free in a specific region of the parking space zone, this can be shown by means of a red color. The number of the respectively free parking space areas can in particular also be displayed. The information shown on the display surface can also "migrate", i.e. can move on the display surface in the direction of free parking space areas.

The display of free and/or occupied parking space areas can take place in those areas of the display surface that correspond to the respective parking space areas. This means that free and/or occupied parking space areas can each be displayed on the display surface where the display surface (or a normal vector of the display surface) points in the direction of the free and/or occupied parking space areas.

The parking space monitoring system can also have a plurality of display units that are arranged at different positions and/or can have a plurality of detection systems.

Advantageous further developments of the invention can be seen from the description, from the drawings and from the dependent claims.

In accordance with a first advantageous embodiment, the display surface has a plurality of individually triggerable pixels, with the pixels being distributed over the different surface areas. The pixels can either all represent a common color or can have different colors in part. A color display can thus e.g. be provided with which practically any desired changeable information can be presented. The display surface can, for example, comprise a plurality of light-emitting diodes (LEDs) or an LCD display. If luminous pixels are used, the information shown can also be easily recognized at night.

In accordance with a further advantageous embodiment, the display surface is shaped at least partly in the form of a lateral cylinder surface and/or elliptically and/or as planar and/or in the form of the lateral surface of a truncated cone. It is to be understood by this that the display surface has an area that is formed e.g. in the manner of the lateral surface of a cylinder or of the lateral surface of a truncated cone. This area does not, however, e.g. have to comprise a complete lateral surface of a cylinder, but can also only comprise a part section of such a lateral surface of a cylinder. The display surface can accordingly have different shapes and can in particular be curved region-wise. The display surface in this respect preferably forms a continuous surface so that the information displayed on the display surface can be presented without visible breaks or the like.

The display surface is preferably configured completely in the form of the lateral surface of a truncated cone.

The display surface can also comprise a plurality of planar surfaces that are adjacent to one another and in this manner form a polygon, in particular a hexagon or an octagon, or a part of a polygon in a plan view. A round or circular shape of the display surface can be approximated by a plurality of such planar surfaces, with it being advantageous that the polygon can be formed from planar LED panels or LED elements.

The display surface can in particular span an angle of approximately 180° and can thus form a semicircle in a plan view. The semicircle could also be approximated by a plurality of planar surfaces of the display surface in this case.

In accordance with a further advantageous embodiment, the display surface is at least substantially visible from all sides. This means that the display surface is visible in the plane from every point in the vicinity. For this purpose, the display surface can include an angle of 270°, preferably of at least 350° or 360°.

In accordance with a further advantageous embodiment, the display surface extends at least partly around a fastening element, with the fastening element preferably being a pole and in particular a pole of a street lighting device. The display unit can be attached in an elevated position above the ground by the attachment to a pole of a street lighting device so that it is already visible from a great distance. A driver can thus already see the display unit when driving into a large parking space zone and can orient himself using the information shown on the display surface. It is additionally ensured by the arrangement around the pole that information presented on the display surface is not covered by the pole from any direction of view. Due to the good visibility of the display unit and of the information shown thus achieved, the number of required display units can be kept small so that the costs for the parking space monitoring system can be reduced.

The display unit can in particular be supplied with electric energy via the power supply of the street lighting by the attachment to the pole of a street light. The effort and/or expense for installing the display unit can hereby be considerably cut since it is possible to make use of existing infrastructure.

The fastening element can be anchored in the ground, in particular between a plurality of parking space areas of the parking space zone. Alternatively, the fastening element can also be fastened in the ground adjacent to the parking space zone and/or to a parking space area. The fastening element preferably extends substantially perpendicular (i.e. vertically) from the ground at least up to the display unit and/or to the detection system. The parking space area and/or the display unit and/or the detection system can in particular be arranged in an outdoor region (e.g. in the open air).

Both the display unit and the detection system are particularly preferably attached to fastening elements above the parking space areas or above the parking space zone. In this manner, an easily recognizable connection can be provided between the parking space areas monitored by the detection system and the display unit.

In accordance with an embodiment, one respective display unit is provided for at least four parking space areas. This means that in particular information on the occupancy status of at least four parking space areas is displayed simultaneously on the display surface of a display unit. The maximum number of parking space areas for which information is shown on an individual display surface can vary in dependence on the parking space zone (e.g. street, company parking lot, etc.) and can amount, for example, to 8, 10, 30 or also 50 parking space areas. For an even larger number of parking space areas, a plurality of display units can be attached to different, spaced apart poles of street lighting units or the like, e.g. along a street.

The display unit can be arranged spaced apart from the detection system. The detection system can in particular be attached in an elevated manner in comparison with the display unit to the same fastening element (i.e. to the pole).

In accordance with a further advantageous embodiment, the display unit has a spacing from the fastening element peripherally. This means that the display unit can, for example, have a central passage hole for the pole of the street lighting device, with the display unit comprising a spacing from the pole of the street lighting device peripherally. The pole of the street lighting device can thus be enclosed by the display unit. The display unit is in particular arranged symmetrically and/or rotationally symmetrically around the fastening element. Due to the spacing from the fastening element, the display unit can be fastened to different fastening elements (that is to fastening elements having different diameters or different sizes) since size differences can be compensated by the spacing. In addition, the display unit can create the impression of "floating" over the parking space areas due to the spacing from the fastening element.

The display unit is particularly preferably attached to the fastening element by means of a size-adjustable clip, with in particular one or more length-adjustable spacers being provided between the clip and the display unit. The display unit can be fastened to practically any desired poles in a short time due to the size-adjustable clip. An adaptation to the pole can in this respect take place by the size adjustability of the clip. The spacers can subsequently be set to a matching length in dependence on the diameter of the pole. The spacers can, for example, be screws, springs or the like.

In accordance with a further advantageous embodiment, the display unit is formed in ring shape and comprises the display surface at a peripheral outer side. The components required for the display of the information such as an energy supply or a control device can be provided within the display surface.

Solar cells that enable an autonomous use of the display unit can preferably be provided at an upper side of the display unit. Energy that enables an operation of the display unit at night can in particular be generated during the day by the solar cells.

The upper side and the lower side of the display unit can each be formed in disk shape or in annular disk shape and/or as planar.

In accordance with a further advantageous embodiment, the display unit comprises a plurality of segments that can be joined together and that can be electrically connected to one another by means of electric contacts. The division of the display unit into segments can allow a simple assembly. The segments can in this respect e.g. be arranged around a pole and can then be joined together. An electrical connection of all the segments can take place automatically on the joining together. Each segment preferably comprises a part of the display surface. The segments are in particular each identical on the outside and can each extend, for example, over an angular range of 90° or 120°. Alternatively, the display unit can be made up of exactly two segments. In this respect, two segments can e.g. be used that each extend over an angular range of 180°. It is likewise possible to complete a segment having an angular range of 270° with a further segment that extends over 90°.

The division of the display unit into a plurality of segments offers the advantage that individual segments can be separately replaced. In addition, master segments can be provided that, for example, communicate with the detection system and receive the information to be presented. The remaining segments can be slave segments. At least one master segment preferably has to be present in each display unit to ensure the function of the display unit. It is hereby in particular possible, for example, to introduce new functions into the display unit only by the replacement of the master segment, with the slave segments being able to continue to be used without changes. In addition, the advantage results that the individual segments can be replaceable on the setting up of larger parking space monitoring systems having a plurality of display units so that the display units can be built up in modular form on site.

In accordance with a particularly preferred embodiment, at least some of the surface areas are inclined in the direction of the ground. The information shown on the display surface can also be easily read from positions that are located close to the display unit by the inclination in the direction of the ground. Glare from solar reflections can also be reduced. An inclination in the direction of the ground in this respect means that a normal vector of the respective surface areas faces in the direction of the ground or would intersect a plane of the ground.

The display surface can in particular be configured in the form of the lateral surface of a truncated cone to implement an inclination in the direction of the ground.

In accordance with a further advantageous embodiment, different surface areas are inclined by different amounts in the direction of the ground. It is hereby made possible, for example, to incline the display surface more in the direction of the ground at a sidewalk side of the display unit. Since the information is typically read from a smaller distance by pedestrians, the greater inclination here facilitates the reading of the information shown. Different information can preferably be presented in the surface areas with greater inclination than in surface areas with less inclination. For example, information on the weather, emergency numbers, advertising or similar can be shown in the surface areas with greater inclination.

In accordance with a further advantageous embodiment, the detection system and the display unit are attached to the same fastening element and in particular use a power supply of the fastening element in common. In this manner, the installation of the parking space monitoring system can be greatly simplified since the already existing infrastructure of the fastening element is used a multiple of times, that is for the detection system and for the display unit.

The detection system can be arranged at a point of the fastening element that is as high as possible above the ground to obtain a good overview of the parking space zone and to be able to monitor parking space zones that are as large as possible. In addition, communication between the detection system and the display unit is facilitated by the attachment of the detection system and the display unit to the same fastening element.

The detection system and the display unit are particularly preferably configured to communicate by means of radio. The installation of the parking space monitoring system is hereby further simplified since no additional lines, e.g. for a data bus, have to be installed. The display unit can comprise a radio device, in particular a receiver, for communication by means of radio. The detection system can likewise have a corresponding radio device that transmits data to the display unit. Wireless LAN, Bluetooth, ZigBee and the like can, for example, be used for the radio communication. The display unit can in particular also provide a public wireless LAN that can be used by users of the parking space zone.

Alternatively, the display unit can also communicate with the detection system or with a server of the detection system by means of a mobile radio network.

Alternatively or additionally to the communication by means of radio, the detection system and the display unit can also exchange information over a common power supply. For this purpose, for example, so-called power-line communication (PLC) can be used with which information is modulated onto a power line by means of a plurality of carrier frequencies. A data transmission by means of PLC can be of advantage when one or more display units and/or one or more detection systems have a common power supply (for example, when the detection systems and the display units are attached to different poles of a street lighting of a street). A range can then be achieved by means of PLC that can exceed that of radio systems.

In accordance with a further advantageous embodiment, the detection system and the display unit are arranged in a common assembly. The assembly can be the housing of the display unit. In this respect, the detection system can e.g. be attached in a cut-out in a lower side of the display unit or can detect the parking space zone through the cut-out. The detection system can in particular be arranged in a master segment of the display unit.

The installation of the parking space monitoring system can be even further simplified by the combination of the detection system and the display unit since only the typically required components for the display unit have to be installed. In addition, the effort for the communication between the display unit and the detection system can be considerably reduced.

In accordance with a further advantageous embodiment, the detection system comprises a camera and is configured to identify free and occupied parking space areas with reference to individual images of the camera. The detection system can in particular use image processing algorithms to recognize free and occupied parking space areas. Alternatively or additionally, the detection system can also comprise radio transponders, ultrasound sensors, radar sensors and/or ground sensors to recognize free and occupied parking space areas.

On the evaluation of single images, i.e. still images, the occupancy status of a parking space area is preferably determined solely with reference to a single image.

In accordance with a further advantageous embodiment, the display unit comprises at least one environmental sensor and presents measured values of the environmental sensor. A current temperature, particulate pollution, a current $CO_2$ value, noise, traffic frequency or pedestrian frequency and the like can, for example, be measured using the environmental sensor. Data detected by the environmental sensor can be displayed directly and thus locally by the display unit. An added value of the parking space monitoring system can hereby result in that the display unit is not only used for presenting free and occupied parking space areas, but also provides advanced information for uses of the parking space zone.

Figure 2:
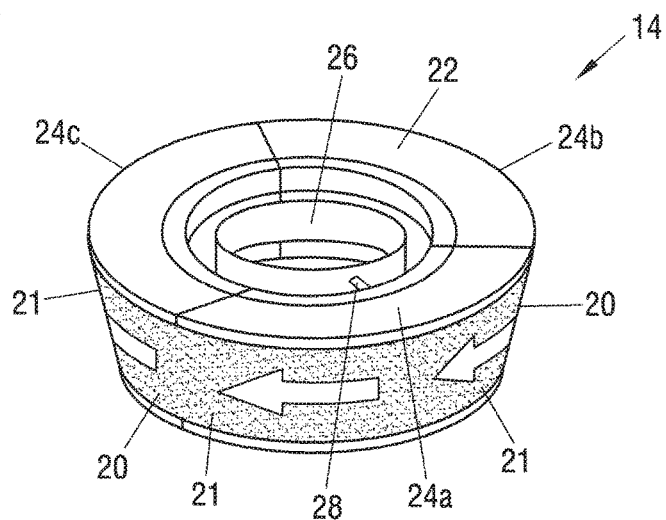

The invention will be described in the following purely by way of example with reference to the drawings. There are shown:

FIG. 1 a parking space monitoring system attached to a lamp pole;

FIG. 2 a display unit that shows a first kind of information; and

Figure 3:
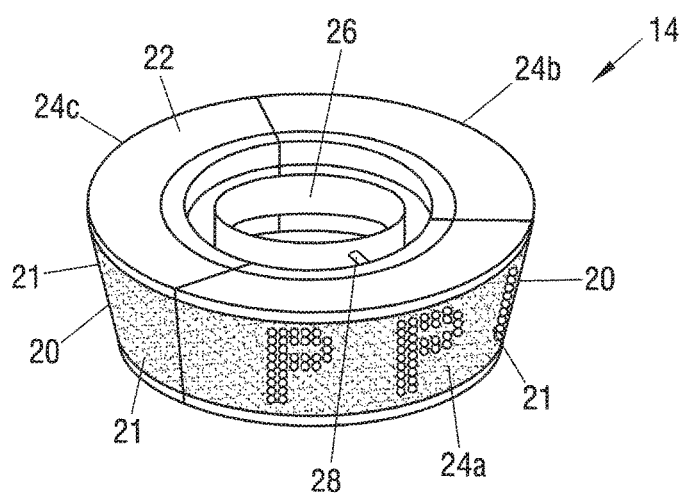

FIG. 3 a display unit that shows a second kind of information.

FIG. 1 shows a parking space monitoring system 10 that comprises a detection system 12 and a display unit 14. The detection system 12 and the display unit 14 are attached spaced apart from one another to a pole 16 of a street lighting device 18, with the detection system 12 having a greater spacing from the ground (not shown) than the display unit 14.

The detection system 12 comprises a camera (not shown) that monitors a parking space zone (likewise not shown) surrounding the street lighting device 18 and recognizes free and occupied parking space areas in the parking space zone.

The display unit 14 has a peripheral display surface 20 that has the shape of the lateral surface of a truncated cone. The display surface 20 is formed as curved and comprises a plurality of (more precisely an infinitely large number of infinitesimally small) planar areas that are adjacent to one another, adjoin one another, and each have a different spatial orientation. The display surface 20 comprises a plurality of individually triggerable pixels that are formed by differently colored LEDs 21.

The display surface 20 is bounded by an annular disk-shaped upper side 22 and by a likewise annular disk-shaped lower side (not shown).

The display unit 14 comprises three segments 24a, 24b, 24c that each extend over an angular rang of 120° and that have electrical connections in their interior to the respective adjacent segments 24a, 24b, 24c.

The display unit 14 is fastened to the pole 16 by means of a size-adjustable clip 26 that is in turn connected to the segments 24a, 24b, 24c by means of screws 28. The screws 28 are adjustable in length, whereby the display unit can be attached to poles 16 having different diameters.

The detection system 12 and the display unit 14 each comprise radio devices (not shown) to communicate with one another. The display unit 14 can present different information in different areas on its display surface 20, as shown in FIG. 2 and FIG. 3, using the data received by the detection system 12.

FIG. 2 and FIG. 3 show the display unit 14 without the pole 16. In FIG. 2, arrows migrating over the display surface 20 are shown that indicate to a driver the direction in which the next free parking space area is located. FIG. 3 shows the representation of a parking space symbol on the display unit 14 so that it is made visible that a parking space zone is located in the environment of the display unit 14.

REFERENCE NUMERAL LIST 10 parking space monitoring system
12 detection system
14 display unit
16 mast
18 street lighting device
20 display surface
21 LED
22 upper side
24a, 24b, 24c segment
26 clip
28 screw

The invention claimed is:

1. A parking space monitoring system for detecting free and occupied parking space areas in a parking space zone, the parking space monitoring system comprising
a detection system that is configured to detect a plurality of different vehicles on the parking space areas of the parking area zone; and at least one display unit for displaying at least one of a plurality of different occupied parking space areas and a plurality of free parking space areas, wherein the display unit has a display surface for presenting information, wherein the display surface comprises at least two surface areas, with the surface areas being adjacent to one another and/or adjoining one another and each having a different spatial orientation, with the display unit being configured to display different information in different surface areas, and wherein the display surface extends at least partly around a fastening element.

2. The parking space monitoring system in accordance with claim 1,
wherein the information comprises indications of different occupied and/or free parking space areas.

3. The parking space monitoring system in accordance with claim 1,
wherein the display surface has a plurality of individually controllable pixels, with the pixels being distributed over the different surface areas.

4. The parking space monitoring system in accordance with claim 1,
wherein the display surface is shaped at least in part as at least one of the following in the manner of a lateral surface of a cylinder, elliptically, in a planar manner and in the form of the lateral surface of a truncated cone.

5. The parking space monitoring system in accordance with claim 1,
wherein the display surface is at least substantially visible from all sides.

6. The parking space monitoring system in accordance with claim 1,
wherein the fastening element is a pole.

7. The parking space monitoring system in accordance with claim 1,
wherein the display unit peripherally has a spacing from the fastening element.

8. The parking space monitoring system in accordance with claim 1,
wherein the display unit is attached to the fastening element by means of a size-adjustable clip, with spacers being provided between the clip and the display unit.

9. The parking space monitoring system in accordance with claim 1,
wherein the fastening element is anchored in the ground and extends substantially perpendicular from the ground at least up to the display unit.

10. The parking space monitoring system in accordance with claim 1,
wherein the display unit is of annular form and comprises the display surface at a peripheral outer side.

11. The parking space monitoring system in accordance with claim 1,
wherein the display unit comprises a plurality of segments that can be joined together and that are electrically connectable to one another by means of electric contacts.

12. The parking space monitoring system in accordance with claim 1,
wherein at least some of the surface areas are inclined in the direction of the ground.

13. The parking space monitoring system in accordance with claim 12,
wherein different surface areas are inclined by different amounts in the direction of the ground.

14. The parking space monitoring system in accordance with claim 1,
wherein the detection system and the display unit are attached to the same fastening element.

15. The parking space monitoring system in accordance with claim 14,
wherein the detection system and the display unit use a power supply of the fastening element.

16. The parking space monitoring system in accordance with claim 1,
wherein the detection system and the display unit are configured to communicate by means of radio.

17. The parking space monitoring system in accordance with claim 1,
wherein the detection system and the display unit are arranged in a common assembly.

18. The parking space monitoring system in accordance with claim 1,
wherein the detection system comprises a camera and is configured to identify free and occupied parking space areas with reference to individual images of the camera.

19. The parking space monitoring system in accordance with claim 1,
wherein the display unit comprises at least one environmental sensor and presents measured values of the environmental sensor.

20. A parking space monitoring system for detecting free and occupied parking space areas in a parking space zone, the parking space monitoring system comprising
a detection system that is configured to detect a plurality of different vehicles on the parking space areas of the parking area zone; and
at least one display unit for displaying at least one of a plurality of different occupied parking space areas and a plurality of free parking space areas, wherein the display unit has a display surface for presenting information, and the display unit is of annular form and comprises the display surface at a peripheral outer side,
wherein the display surface comprises at least two surface areas, with the surface areas being adjacent to one another and/or adjoining one another and each having a different spatial orientation, and with the display unit being configured to display different information in different surface areas.

21. The parking space monitoring system in accordance with claim 20,
wherein the information comprises indications of different occupied and/or free parking space areas.

22. The parking space monitoring system in accordance with claim 20,
wherein the display surface has a plurality of individually controllable pixels, with the pixels being distributed over the different surface areas.

23. The parking space monitoring system in accordance with claim 20,
wherein the display surface is shaped at least in part as at least one of the following in the manner of a lateral surface of a cylinder, elliptically, in a planar manner and in the form of the lateral surface of a truncated cone.

24. The parking space monitoring system in accordance with claim 20, wherein the display surface is at least substantially visible from all sides.

\* \* \* \* \*